United States Patent
Yoshikawa et al.

(10) Patent No.: US 9,012,583 B2
(45) Date of Patent: Apr. 21, 2015

(54) FLOW IMPROVER FOR OILS AND FATS

(75) Inventors: Fumitaka Yoshikawa, Hyogo (JP); Hideki Kawamoto, Hyogo (JP); Keiji Hirao, Hyogo (JP)

(73) Assignee: NOF Corporation, Tokyo (JP)

( * ) Notice: Subject to any disclaimer, the term of this patent is extended or adjusted under 35 U.S.C. 154(b) by 435 days.

(21) Appl. No.: 13/578,232

(22) PCT Filed: Feb. 2, 2011

(86) PCT No.: PCT/JP2011/052124
§ 371 (c)(1),
(2), (4) Date: Aug. 9, 2012

(87) PCT Pub. No.: WO2011/099406
PCT Pub. Date: Aug. 18, 2011

(65) Prior Publication Data
US 2012/0316306 A1    Dec. 13, 2012

(30) Foreign Application Priority Data
Feb. 10, 2010 (JP) ................................. 2010-027949

(51) Int. Cl.
*C08F 222/40* (2006.01)
*C08F 220/24* (2006.01)
*C10L 1/236* (2006.01)
*C10L 10/14* (2006.01)
*C10L 10/16* (2006.01)

(52) U.S. Cl.
CPC ............. *C08F 220/24* (2013.01); *C08F 222/40* (2013.01); *C10L 1/2364* (2013.01); *C10L 10/14* (2013.01); *C10L 2230/22* (2013.01); *C10L 10/16* (2013.01); *C10L 2250/04* (2013.01); *C10L 2200/0484* (2013.01); *C10L 2270/026* (2013.01)

(58) Field of Classification Search
CPC ... A01N 43/40; A01N 2300/00; A01N 25/04; A01N 25/32; A01N 43/42
USPC .......................................................... 526/262
See application file for complete search history.

(56) References Cited

U.S. PATENT DOCUMENTS

| | | | |
|---|---|---|---|
| 4,511,369 A | 4/1985 | Denis et al. | |
| 4,731,095 A | 3/1988 | Garapon et al. | |
| 6,565,616 B1 * | 5/2003 | Krull et al. | 44/329 |

FOREIGN PATENT DOCUMENTS

| | | |
|---|---|---|
| EP | 1526167 A2 | 4/2005 |
| JP | 1284514 A | 11/1989 |
| JP | 2001288484 A | 10/2001 |
| JP | 2002167586 A | 6/2002 |
| JP | 2005509084 A | 4/2005 |
| JP | 2005350629 A | 12/2005 |
| JP | 2007186700 A | 7/2007 |
| JP | 2007308701 A | 11/2007 |
| JP | 2007332359 A | 12/2007 |
| JP | 2008120098 A | 5/2008 |
| WO | WO03042336 A2 | 5/2003 |
| WO | WO2005063951 A | 7/2005 |

* cited by examiner

*Primary Examiner* — Ling Choi
*Assistant Examiner* — Chun-Cheng Wang
(74) *Attorney, Agent, or Firm* — Muncy, Geissler, Olds & Lowe, P.C.

(57) ABSTRACT

The present invention provides a flow improver for oils and fats, by which a sufficient improvement in the flowability of oils and fats can be achieved, when oils and fats are used as fuels. This flow improver for oils and fats comprises a polymer including constitutional units (I), (II), and (III), and having a weight-average molecular weight in the range of 5,000 to 100,000. The molar fraction a of the constitutional unit (I) is in the range of 0.4 to 0.8, the molar fraction b of the constitutional unit (II) is in the range of 0.1 to 0.3, and the molar fraction c of the constitutional unit (III) is in the range of 0.1 to 0.3.

1 Claim, No Drawings

FLOW IMPROVER FOR OILS AND FATS

BACKGROUND OF THE INVENTION

1. Field of the Invention

The present invention relates to a flow improver for oils and fats for improving the flowability of oils and fats, when oils and fats are used as fuels.

2. Description of the Related Art

In the recent years, as environmental awareness is rising, fuels obtained from biological resources are being tried out for use. For example, ethanols obtained by fermenting whole grains such as field corn, and waste wood, and fatty acid methyl esters obtained by performing ester exchange of animal and vegetable oils and fats, are being examined.

On the other hand, in addition to fuels thus obtained by improving the quality of biological resources, animal and vegetable oils and fats themselves are being tried out for use as fuels for boilers, diesel engines, and heaters, and in order to enable their problem-free use as fuels, various studies for improving the flowability of oils and fats are being conducted. For example, Patent Literature 1 describes a method of improving the quality of oils and fats by performing the ozone process and photo irradiation process to use them, and Patent Literature 2 describes a method of using hydrocarbon compositions obtained by hydrogen-treating the oils and fats, respectively. However, both the methods still have problems such as consumption of a large amount of energy in the quality-improvement process, or the need of equipment for improving the quality.

On the other hand, Patent Literature 3 describes a method of using an alkyl methacrylate polymer having a specific carbon chain length and molecular weight distribution as a flow improver of oils and fats. However, a sufficient improvement in the flowability cannot be achieved with this method, and thus the method is not satisfactory.

CITATION LIST

Patent Literature

[PTL 1] WO 2005-063951
[PTL 2] JPA 2007-332359
[PTL 3] JPA 2005-350629

SUMMARY OF THE INVENTION

Technical Problem

An object of the present invention is to provide a flow improver for oils and fats, by which a sufficient improvement in the flowability of oils and fats can be achieved, when oils and fats themselves are used as fuels.

Solution to Problem

The present inventors figured out that a polymer having a specific structure improves the flowability of oils and fats, and with this knowledge, conceived the present invention.

That is, the flow improver for oils and fats according to the present invention comprises a polymer including constitutional units (I), (II), and (III), and having a weight-average molecular weight in the range of 5,000 to 100,000, such that the molar fraction a of the constitutional unit (I) is in the range of 0.4 to 0.8, the molar fraction b of the constitutional unit (II) is in the range of 0.1 to 0.3, and the molar fraction c of the constitutional unit (III) is in the range of 0.1 to 0.3. In the specification herein, when numerical values are mentioned as in "AA to BB", then, AA and BB are inclusive in a range. For example, "AA to BB" indicates between AA and BB inclusive.

[Chem. 1]
[In the formula, $R_1$ represents a straight chain saturated alkyl group having 12 to 16 carbon atoms,
$R_2$ represents a methyl group or hydrogen atom,
$R_3$ represents a straight chain saturated alkyl group having 6 to 18 carbon atoms, and
$R_4$ represents a straight chain saturated alkyl group having 6 to 20 carbon atoms.]

Advantageous Effects of Invention

According to the present invention, it is possible to sufficiently improve the flowability of oils and fats, and provide oils and fats having an excellent flowability. Therefore, it becomes easy to handle oils and fats when such oils and fats are used as fuels for boilers, diesel engines, and heaters.

DETAILED DESCRIPTION OF THE PREFERRED EMBODIMENTS

The following describes the present invention in detail.

The flow improver for oils and fats (hereinafter, simply called the "flow improver") according to the present invention comprises a polymer including a constitutional unit (I), a constitutional unit (II), and a constitutional unit (III) in specific molar fractions, respectively. The polymer including each of the constitutional units can be obtained by polymerizing an alkyl (meth)acrylate, an α-olefin, and maleic anhydride as monomers, then reacting an anhydrous ring and a primary amine of the polymer thus obtained to result in imidization. Alternatively, the polymer can also be obtained by copolymerizing an alkyl (meth)acrylate, an α-olefin, and a maleinimide. In the present invention, performing imidization after obtaining the polymer proves to be beneficial in obtaining the polymer of the present invention, and is therefore, desirable. In the polymer of the present invention, each constitutional unit may be either a block copolymer or a random copolymer. Furthermore, alkyl (meth)acrylate indicates both alkyl methacrylate and alkyl acrylate.

The alkyl (meth)acrylate used as a monomer is a monomer corresponding to the constitutional unit (I), and is also a (meth)acrylate in which the alkyl group is a straight chain saturated alkyl group with 12 to 16 carbon atoms. Specific examples include dodecyl (meth)acrylate, tridecyl (meth)acrylate, tetradecyl (meth)acrylate, pentadecyl (meth)acrylate, and hexadecyl (meth)acrylate. Any one type selected from the aforementioned alkyl (meth)acrylates may be used alone, or two or more types may be used in combination. The number of carbon atoms of the alkyl group is not desired to be less than 12 or more than 16 as sufficient flowability of oils and fats is not obtained under such a condition.

The α-olefin used as a monomer is a monomer corresponding to the constitutional unit (II), and is also a straight chain α-olefin with 8 to 20 carbon atoms. Specific examples include α-octene, α-decene, α-dodecene, α-tetradecene, α-hexadecene, α-eicosene, and the like, and particularly, an α-olefin with 10 to 16 carbon atoms has a high effect of improvement in the flowability, and is therefore, preferable. Any one type selected from the aforementioned α-olefins may be used alone, or two or more types may be used in combination.

The primary amine that is reacted with the anhydrous ring of the polymer derived from maleic anhydride used as a monomer is a primary amine having a straight chain saturated alkyl with 6 to 20 carbon atoms, whose specific examples include hexyl amine, octyl amine, dodecyl amine, tridecyl amine, tetradecyl amine, pentadecyl amine, hexadecyl amine, octadecyl amine, eicosyl amine, and the like, and particularly, a primary amine having an alkyl with 8 to 14 carbon atoms has a high effect of improvement in the flowability, and is therefore, preferable. Any one type selected from the aforementioned primary amines may be used alone, or two or more types may be used in combination.

As regards the molar fraction of each constitutional unit, the molar fraction a of the constitutional unit (I) is in the range of 0.4 to 0.8, the molar fraction b of the constitutional unit (II) is in the range of 0.1 to 0.3, and the molar fraction c of the constitutional unit (III) is in the range of 0.1 to 0.3. Particularly, when the molar fraction a is in the range of 0.6 to 0.8, the molar fraction b is in the range of 0.1 to 0.2, and the molar fraction c is in the range of 0.1 to 0.2, the effect of improvement in the flowability is high, and is therefore, preferable. Furthermore, when the molar fractions a, b, and c are outside the range described above, a sufficient flowability of oils and fats is not achieved, and is therefore, not preferable.

The flow improver according to the present invention comprises a polymer including the aforementioned constitutional units (I), (II), and (III) in specific molar fractions, respectively. The weight-average molecular weight of the polymer is in the range of 5,000 to 100,000, and preferably in the range of 10,000 to 50,000. Sufficient flowability may not be obtained when the weight-average molecular weight is less than 5,000, and when the weight-average molecular weight exceeds 100,000, the handling ability of the polymer might decline. The weight-average molecular weight can be measured by gel permeation chromatography that uses tetrahydrofuran as a developing solvent, and can be evaluated as the weight-average molecular weight of polystyrene.

The flow improver of the present invention is obtained by performing polymerization of the monomers corresponding to each constitutional unit. Although the method of polymerization is not particularly limited, from the viewpoint of ease of polymerization and excellent handling of polymer, solution polymerization that makes use of a radical polymerization initiator is preferable. An azo initiator or peroxide initiator may be used as the radical polymerization initiator, and a hydrocarbon solvent and aromatic solvent with excellent solubility of the monomer and polymer may be used as the solvent.

Furthermore, when imidization is performed for a polymer using maleic anhydride as a monomer, then after obtaining the polymer, the primary amine is added in the ratio of 0.7 to 1.2 moles per one mole of maleic anhydride to the polymer, and imidization reaction is performed at 70 to 170° C. to obtain a polymer including the aforementioned constitutional units (I), (II), and (III).

The oils and fats to which the flow improver of the present invention can be added may be either vegetable fats and oils or animal fats and oils, and include, for example, rapeseed oil, soybean oil, safflower oil, sunflower oil, palm oil, palm olein oil, palm kernel oil, coconut oil, Jatropha oil, beef tallow, lard, and the like. The aforementioned oils and fats may be used alone, or two or more types may be used in combination.

Normally, the flow improver of the present invention is used by adding 0.001 to 1 wt % with respect to the oils and fats. A commonly used fuel additive may also be combined with the flow improver of the present invention as long as the effect of the present invention is not lost. In order to further improve the flowability of oils and fats, the amount of addition of the flow improver can be increased, or fuels such as fatty acid methyl esters and kerosene can be blended. Furthermore, for oils and fats with a high pour point, it is preferable to use a flow improver having a high exothermic peak temperature measured with a differential scanning calorimeter (DSC), whereas for oils and fats with a low pour point, it is preferable to use a flow improver having a low exothermic peak temperature. Particularly, when the pour point of oils and fats ($T_1$) and the exothermic peak temperature ($T_2$) of the flow improver satisfies the relational expression (1) described below, a more excellent flowability improvement effect can be obtained.

$$T_1 - 30 \leq T_2 \leq T_1 \tag{1}$$

EXAMPLES

The following describes the present invention in further detail by using examples.

[Example of Manufacturing Polymer 1]

150 ml of xylene, 100 g (0.416 mol) of dodecyl acrylate, 69.71 g (0.312 mol) of C16 α-olefin, and 30.60 g (0.312 mol) of maleic anhydride were fed in to a reactor equipped with an agitation apparatus, a condenser tube, and an inert gas inlet, and the temperature was increased up to 120° C. while agitating the fed components. Next, 1.54 g (0.009 mol) of tert-Butyl peroxybenzoate, as the polymerization initiator, was diluted in 50 ml of xylene, and fed into a drop-tube. The polymerization initiator was dropped in a period of two hours, and the polymerization reaction was conducted at 120° C. By performing aging for 2.5 hours after dropping, a pale yellow polymer solution was obtained.

Next, the temperature within the system was dropped down to 40° C., and then 40.32 g (0.312 mol) of n-octylamine and 40 ml of xylene was fed while performing agitation. Following this, the temperature was increased up to 110° C., and after maintaining the temperature at 110° C. for three hours, the imidization reaction was performed, and a xylene solution of 50 wt % of light yellow colored polymer 1 was obtained.

Furthermore, polymerization was performed in the same way as example 1 by using monomers described in Table 1, and polymers 2 to 9 were manufactured. The weight-average molecular weight was measured by gel permeation chromatography (HLC-8220GPC manufactured by TOSOH CORPORATION) using tetrahydrofuran as a developing solvent, and was evaluated as the weight-average molecular weight of polystyrene. TSK gel Super 114000 (6 mm ID×15 cm), TSK gel Super H2000 (6 mm ID×15 cm), and TSK gel Super H1000 (6 mm ID×15 cm) manufactured by TOSOH CORPORATION were used as the separation column. Furthermore, as regards the method of measuring the exothermic peak temperature, first of all, in a differential scanning calorimeter (EXSTAR 6000 manufactured by SEIKO INSTRUMENTS, INC.) 10 mg of the polymer was added to the sample pan (aluminum pan manufactured by SEIKO INSTRUMENTS, INC.), and after increasing the temperature up to 100° C., the temperature was allowed to stay there for 10 minutes. Next, the exothermic peak obtained when the polymer is cooled from 100° C. up to −60° C. at the rate of 10° C./min was measured. The exothermic peak temperature was evaluated as the temperature during the point of reverse of the DDSC (DSC derivative) curve, that is, at the time the DDSC value becomes zero, in the exothermic peak of the DSC curve. Furthermore, when a plurality of exothermic peak temperatures were obtained, the DSC value was evaluated for each point-of-reverse temperature, and the temperature when the DSC value was the highest was assumed as the exothermic peak temperature. Furthermore, the numeric value in each column of $R_1$, $R_3$, and $R_4$ in Table 1 indicates the number of carbon atoms of the straight chain saturated alkyl group, and in the $R_2$ column, "H" indicates the hydrogen atom and "Me" indicates the methyl group, respectively.

TABLE 1

|  | $R_1$ | $R_2$ | $R_3$ | $R_4$ | Molar fraction a | Molar fraction b | Molar fraction c | Weight-average molecular weight | Exothermic peak Temperature $T_2$ [° C.] |
|---|---|---|---|---|---|---|---|---|---|
| Polymer 1 | 12 | H | 14 | 8 | 0.4 | 0.3 | 0.3 | 21000 | −28.5 |
| Polymer 2 | 14 | Me | 10 | 12 | 0.6 | 0.2 | 0.2 | 34000 | −18.8 |
| Polymer 3 | 14 | Me | 10 | 18 | 0.8 | 0.1 | 0.1 | 76000 | −9.2 |
| Polymer 4 | 14 | H | 6 | 12 | 0.7 | 0.1 | 0.2 | 42000 | −25.4 |
| Polymer 5 | 16 | Me | 16 | 12 | 0.6 | 0.2 | 0.2 | 29000 | −3.5 |
| Polymer 6 | 16 | Me | — | — | 1.0 | — | — | 31000 | 9.5 |
| Polymer 7 | — | — | 12 | 12 | — | 0.5 | 0.5 | 43000 | −37.7 |
| Polymer 8 | 8 | Me | 10 | 10 | 0.6 | 0.2 | 0.2 | 25000 | −42.0 |
| Polymer 9 | 18 | Me | 10 | 18 | 0.8 | 0.1 | 0.1 | 52000 | 20.6 |

The pour points of the oils and fats 1 to 5 of Table 2 were measured, and these pour points were similarly written in Table 2. Next, polymers 1 to 9 of Table 1 were added to oils and fats 1 to 5, and the pour points were measured. The pour point after adding the polymer and the difference in the pour points before and after adding the polymer are described in Table 3 and Table 4. In accordance with JIS K-2269, the pour point was measured at an interval of 1° C.

TABLE 2

| Oil and fat | Oil type | Pour point $T_1$ [° C.] |
|---|---|---|
| Oil and fat 1 | Soybean oil | −10 |
| Oil and fat 2 | Rapeseed oil | −14 |
| Oil and fat 3 | Palm olein oil | +7 |
| Oil and fat 4 | Coconut oil | +16 |
| Oil and fat 5 | Jatropha oil | −3 |

TABLE 3

|  | Polymer | Oil and fat | Amount of additive [wt %] | Pour point after addition [° C.] (Difference in the pour points [° C.]) |
|---|---|---|---|---|
| Ex. 1 | Polymer 1 | Oil and fat 1 | 0.25 | −20(10) |
| Ex. 2 | Polymer 1 | Oil and fat 2 | 0.25 | −22(8) |
| Ex. 3 | Polymer 1 | Oil and fat 3 | 0.50 | +5(2) |
| Ex. 4 | Polymer 2 | Oil and fat 1 | 0.10 | −20(10) |
| Ex. 5 | Polymer 2 | Oil and fat 2 | 0.25 | −22(8) |
| Ex. 6 | Polymer 2 | Oil and fat 3 | 0.50 | +3(4) |
| Ex. 7 | Polymer 2 | Oil and fat 4 | 0.50 | +12(4) |
| Ex. 8 | Polymer 3 | Oil and fat 1 | 0.25 | −18(8) |
| Ex. 9 | Polymer 3 | Oil and fat 4 | 0.50 | +13(3) |
| Ex. 10 | Polymer 4 | Oil and fat 2 | 0.25 | −21(7) |
| Ex. 11 | Polymer 4 | Oil and fat 4 | 0.50 | +14(2) |
| Ex. 12 | Polymer 5 | Oil and fat 2 | 0.25 | −20(6) |
| Ex. 13 | Polymer 5 | Oil and fat 3 | 0.50 | +3(4) |
| Ex. 14 | Polymer 5 | Oil and fat 4 | 0.50 | +12(4) |
| Ex. 15 | Polymer 2 | Oil and fat 5 | 0.25 | −8(5) |
| Ex. 16 | Polymer 5 | Oil and fat 5 | 0.25 | −7(4) |

TABLE 4

|  | Polymer | Oil and fat | Amount of additive [wt %] | Pour point after addition [° C.] (Difference in the pour points [° C.]) |
|---|---|---|---|---|
| CEx. 1 | Polymer 6 | Oil and fat 1 | 0.50 | −12(2) |
| CEx. 2 | Polymer 6 | Oil and fat 3 | 0.50 | +7(0) |
| CEx. 3 | Polymer 7 | Oil and fat 2 | 0.50 | −15(1) |
| CEx. 4 | Polymer 7 | Oil and fat 4 | 0.50 | +16(0) |
| CEx. 5 | Polymer 8 | Oil and fat 1 | 0.50 | −13(3) |
| CEx. 6 | Polymer 8 | Oil and fat 4 | 0.50 | +16(0) |
| CEx. 7 | Polymer 9 | Oil and fat 2 | 0.50 | −17(3) |
| CEx. 8 | Polymer 6 | Oil and fat 5 | 0.50 | −3(0) |
| CEx. 9 | Polymer 9 | Oil and fat 5 | 0.50 | −4(1) |

As described in Table 3, by adding the flow improvers of polymers 1 to 5 according to the present invention, to oils and fats, the pour point of oils and fats is seen to decline as compared to before the addition of the polymer.

In contrast, as described in Table 4, the action of decline in the pour point of oils and fats is seen to be weaker than that of the present invention even after adding, to oils and fats, the flow improvers of polymers 6 to 9, which are different from the specification of the present invention.

For example, if examples 7, 9, 11, and 14 are compared with comparisons 4 and 6, the condition of addition of 0.50 wt % of polymer with respect to the oil and fat 4 (coconut oil) is the same for both, however, while the pour point of the oil and fat did not fall in comparisons 4 and 6, the pour point of the oil and fat fell by 2 to 4° C. in examples 7, 9, 11, and 14. That is, it was confirmed that the addition of the flow improvers of polymers 1 to 5 according to the present invention, to oils and fats, resulted in an increase in the flowability of the oils and fats.

In addition to priority claims based on the Japanese Patent Application No. 2010-27949 filed on Feb. 10, 2010, the disclosed contents of the application are incorporated in the description. All references cited herein are also incorporated into the description in their entirety.

INDUSTRIAL APPLICABILITY

According to the flow improver for oils and fats of the present invention, the flowability of oils and fats can be improved. Therefore, when animal and vegetable oils and fats themselves are used as fuels for boilers, diesel engines, and heater, then by adding the flow improver of the present invention to oils and fats, the handling ability of oils and fats can be improved.

What is claimed is:

1. A flow improver for oils and fats, comprising a polymer including constitutional units (I), (II), and (III), and having a weight-average molecular weight in the range of 5,000 to 100,000, such that the molar fraction a of the constitutional unit (I) is in the range of 0.4 to 0.8, the molar fraction b of the constitutional unit (II) is in the range of 0.1 to 0.3, and the molar fraction c of the constitutional unit (III) is in the range of 0.1 to 0.3;

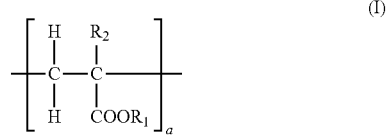

-continued
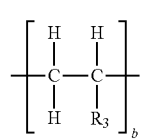
(II)
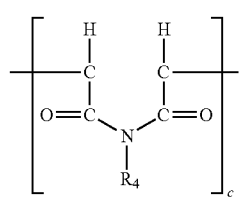
(III)
wherein formula, $R_1$ represents a straight chain saturated alkyl group having 12 to 16 carbon atoms,
$R_2$ represents a methyl group or hydrogen atom,
$R_3$ represents a straight chain saturated alkyl group having 6 to 18 carbon atoms, and
$R_4$ represents a straight chain saturated alkyl group having 6 to 20 carbon atoms.
* * * * *